United States Patent [19]
Ford et al.

[11] Patent Number: 6,091,443
[45] Date of Patent: *Jul. 18, 2000

[54] UNDERWATER VIEWING SYSTEM

[75] Inventors: Randolph K. Ford, Collingwood, Canada; Michael G. Blowers, Plainwell, Mich.

[73] Assignee: Walker Downriggers, Inc., Canada

[ * ] Notice: This patent issued on a continued prosecution application filed under 37 CFR 1.53(d), and is subject to the twenty year patent term provisions of 35 U.S.C. 154(a)(2).

[21] Appl. No.: 08/812,442

[22] Filed: Mar. 6, 1997

[51] Int. Cl.⁷ ...................................................... H04N 7/18
[52] U.S. Cl. .................................................. 348/81; 43/17
[58] Field of Search ................................. 348/81, 84, 85, 348/82, 83, 428; 43/4, 17, 43.12; 370/505; 367/94; H04N 7/18

[56]         References Cited

U.S. PATENT DOCUMENTS

| | | | |
|---|---|---|---|
| 2,735,207 | 2/1956 | Christiansen | 43/15 |
| 3,910,524 | 10/1975 | Ireland | 242/106 |
| 3,916,555 | 11/1975 | Booth et al. | 43/27.4 |
| 3,922,808 | 12/1975 | Rieth et al. | 4/4 |
| 4,010,325 | 3/1977 | Kline | 370/505 |
| 4,031,544 | 6/1977 | Lapetina | 348/81 |
| 4,085,421 | 4/1978 | Gilmour | 348/81 |
| 4,104,917 | 8/1978 | Rieth et al. | 73/343 R |
| 4,191,340 | 3/1980 | Kubanek | 242/54 R |
| 4,206,510 | 6/1980 | Strait | 367/94 |
| 4,253,165 | 2/1981 | Christiansen | 367/96 |
| 4,485,398 | 11/1984 | Charpin, Jr. et al. | 348/81 |
| 4,589,012 | 5/1986 | Songer | 348/428 |
| 4,817,328 | 4/1989 | Hartley et al. | 43/43.12 |
| 4,855,820 | 8/1989 | Barbour | 348/81 |
| 4,903,317 | 2/1990 | Nishihara et al. | 382/244 |
| 4,995,009 | 2/1991 | Altmire et al. | 43/17 |
| 5,111,222 | 5/1992 | Hayakawa et al. | 348/81 |
| 5,483,767 | 1/1996 | Langer | 43/4 |
| 5,511,335 | 4/1996 | Langer | 43/4 |
| 5,581,930 | 12/1996 | Langer | 43/17 |

OTHER PUBLICATIONS

EDN, Color video travels on twisted–pair cable, Raphael Horton, Aug. 17, 1995.
R&D Magazine, Cable TV Runs on Twisted–pair Lines, Sep., 1996.
Chip Allows Broadcasts over Telephone Wire.
Electronic Design, Video–Compression Chip Is The First To Use Wavelets, Paul McGoldrick, Aug. 19, 1996.
Analog Devices, ADV601 Preliminary Data Sheet—Low Cost Multiformat Video Codec, Jan., 1996.

*Primary Examiner*—Andy Rao
*Assistant Examiner*—Gims Philippe
*Attorney, Agent, or Firm*—Olson & Hierl, Ltd.

[57]         ABSTRACT

An underwater viewing system suitable for providing images of an area around an underwater lure is described. The system includes a video camera coupled, via a cable, to a display. The cable has a plurality of electrical leads twisted about, and electrically isolated from, each other. Surrounding the electrical leads is an outer shield comprised of a plurality of stainless steel strands. The shield, and thus the cable, has an outer diameter less than 0.070 inches.

9 Claims, 5 Drawing Sheets

UNDERWATER VIEWING SYSTEM

FIELD OF THE INVENTION

The present invention relates to fishing devices, and in particular to an underwater viewing system having a downrigger cable that provides for the transmission of images about a detachably secured underwater lure.

BACKGROUND OF THE INVENTION

A downrigger is a fishing implement used in conjunction with a regular fishing rod when deep water fishing on the Great Lakes and the oceans. The typical downrigger has a line wound on a manually or electrically operated reel. A heavy weight is placed at the end of the downrigger line which extends from the reel. Further, the downrigger line is detachably fastened to a fishing line having a fish hook with bait or a lure affixed to it.

Both the downrigger line and the fishing line are lowered into the water to a desired depth. When a fish is hooked, the fishing line is separated from the downrigger line as a consequence of the fish pulling on the fish hook to free itself. The fisherman may then play the fish without having the downrigger weight to contend with along with the fish.

As is well known, many species of fish prefer known temperatures. Areas providing such temperatures can be quite deep, especially in the Great Lakes or oceans. Correspondingly, when fishing at such depths, the fisherman cannot see fish approach and strike the lure.

When fishing, it is desirable to have the ability to view the fish. Besides adding excitement to the fishing experience, viewing the fish provides a record in case the fish escapes.

Care must be taken, however, in providing a downrigger line and a device suitable for transmitting real-time images about the lure. In particular, the line must be of a relatively small diameter to fit on a compact trolling reel suitable for the sport fisherman. Further, the tensile strength must be relatively high since significant tension forces are placed on the line when it is payed out a significant distance and especially if the line becomes snagged.

Correspondingly, the present invention provides a system which satisfies the above-discussed criteria while enabling the transmission of images about a detachably secured underwater lure.

SUMMARY OF THE INVENTION

The present invention provides an underwater viewing system for transmitting images about a lure.

The structure embodying the present invention is especially suitable for use with deep water fishing. The invention provides for transmitting images from depths of 200 feet or more. Further, both the desired tensile strength and small diameter required for a downrigger is provided.

The underwater viewing system embodying the present invention includes a cable having a plurality of conductive leads twisted about each other. The leads are electrically isolated from each other and surrounded by an outer shield. The outer shield consists of a plurality of strands of stainless steel forming a downrigger cable having an outer diameter less than 0.070 inches.

BRIEF DESCRIPTION OF THE DRAWINGS

In the accompanying drawings that form part of the specification, and in which like numerals are employed to designate like parts throughout the same.

DESCRIPTION OF THE PREFERRED EMBODIMENT

An underwater viewing system embodying the present invention has a cable with a high tensile strength and small diameter for transmitting differential image signals. The cable includes a plurality of conductive leads that are electrically isolated and twisted about each other. The leads are surrounded by an outer shield consisting of stainless steel strands wherein the cable has an outer diameter less than 0.070 inches.

Figure 1:
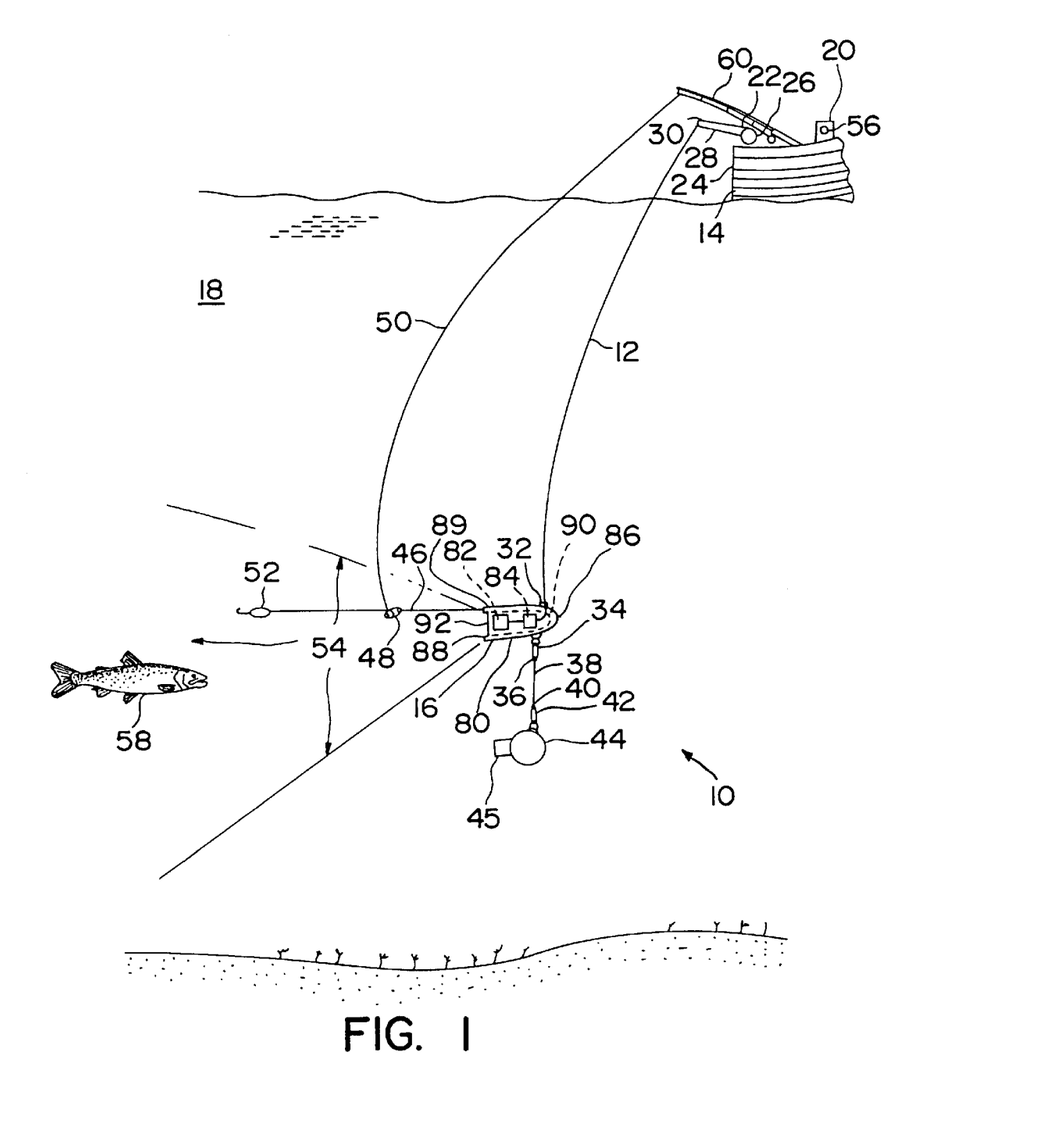
FIG. 1 is a schematic cross-sectional diagram of a lake illustrating the operation of an underwater viewing system in accordance with the present invention with a cable attached to a motorized reel assembly.

Referring to the drawings, and particularly to FIG. 1, an underwater viewing system 10 is depicted having a cable 12 extending from a fishing boat 14 to a camera assembly 16 beneath the surface of the water 18. The cable 12 provides for the real-time transmission of image signals from the camera assembly 16 to the boat 14. Operably connected to the cable 12 is a display 20 on the boat 14 for visually presenting those images introduced within the camera assembly's field of view.

Preferably, cable 12 is attached to a conventional motorized reel assembly 22 mounted on the stern 24 of the boat 14. The reel assembly 22 includes a reel 26 and a flexible action arm 28 generally upwardly sloping away from the reel with a guide wheel 30 rotatably mounted to the end thereof.

The cable 12 is attached to and wrapped around reel 26. The cable 12 extends from the reel 26, over the guide wheel 30 and the edge of the boat 14, and into the water 18. The motorized reel assembly 22 provides for electrically raising and lowering the cable 12 having the underwater camera assembly 16 attached proximate to the cable's free end 32.

Coupled to the camera assembly 16, via a conventional ball bearing swivel 34, is one end 36 of a safety breakaway cable 38. The other end 40 of the safety cable 38 is fastened to a snap swivel 42 that provides for releasable attachment to a relatively heavy metal weight 44.

The weight 44 may vary from, for example, one pound to thirty pounds. The particular weight a fisherman will use depends upon the type of fishing which he is doing, the depth at which he is fishing, whether or not he is trolling or standing still, the presence of currents in the water in which he is fishing and the like.

The weight 44 is conventional in shape and also preferably provides for stability, such as preventing porpoiseing of the camera assembly 16, while traveling through the water 18. Correspondingly, the weight 44 may be shaped generally like a fish, a pancake, a cannonball having a vertical stabilizer or fin 45, or any other suitable shape.

Preferably, the cable 12 has a greater tensile strength than the safety breakaway cable 38. Thus, if the weight 44 becomes snagged during trolling, the safety cable 38 will sever so that the cable 12 and reel assembly 22 are prevented from being damaged. The breakaway cable 38 may consists be made of any suitable material such as nylon, steel, or the like.

Extending from the camera assembly 16 is a cord 46 with a conventional release mechanism 48 attached to the free end of the cord. Mechanism 48 releasably holds onto fishing line 50 having a fishhook or lure 52 tied to the fishing line's free end. Preferably, while line 50 is attached to the release mechanism 48, the lure 52 is continuously in the viewing range 54 of the camera assembly 16 such that, as explained in detail further herein, a substantially representative image 56 of the lure is provided on display 20.

When a fish 58 strikes the lure 52, the efforts of the fish to free itself results in fishing line 50 being released by mechanism 48. Thus, the fisherman is permitted to play the fish in the usual fashion by means of a fishing rod 60 to which the fishing line 50 is secured.

FIG. 1 illustrates an advantage of using the underwater viewing system 10 because, as will be discussed in further detail, the fisherman can actively view an image 56 of the fish on the display 20 as the fish approaches and strikes the lure 52. Thus, the fisherman is alerted before the fish strikes the lure and is shown the size and type of fish as well.

Figure 2:
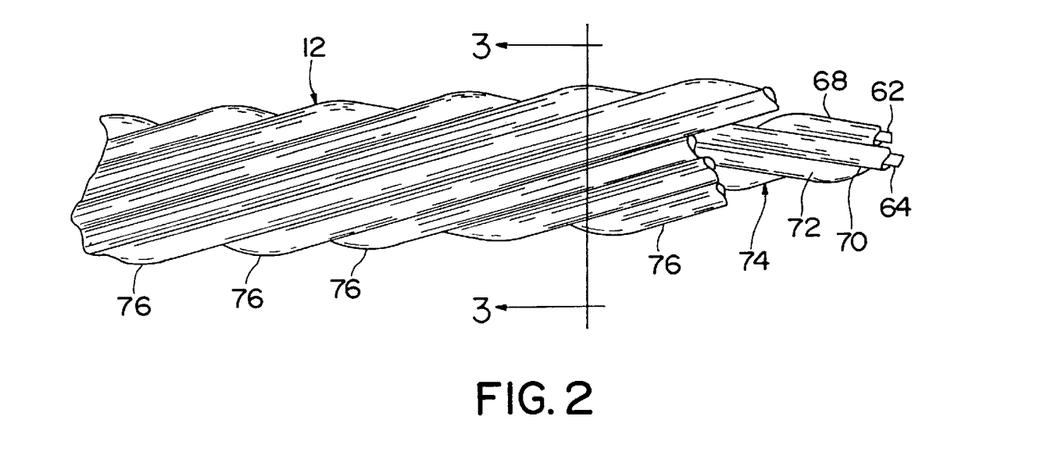
FIG. 2 is a greatly enlarged fragmentary view of the cable shown in FIG. 1.
Figure 3:
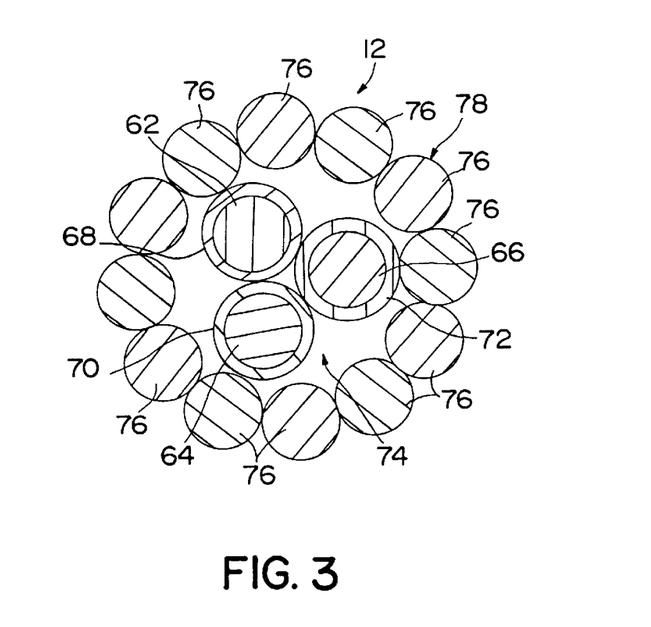
FIG. 3 is a cross sectional view of the cable of FIG. 2, taken along section line 3—3.

Referring now to FIGS. 2 and 3, the cable 12 employed in the underwater viewing system 10 of FIG. 1 is described in greater detail. The cable 12 preferably comprises three conductive leads 62, 64, and 66. Individually surrounding each electrical lead 62, 64, and 66 is an annular longitudinally extending electrically insulating layer 68, 70, and 72, respectively. The insulated conductive leads 62, 64, and 66 are spirally wound around each other to form a helix arrangement 74 wherein the leads preferably twist approximately three (3) times around each other per four (4) centimeters of cable length.

It is desired that each electrical lead 62, 64, and 66 be Brown & Sharpe Wire Gage No. 26 (i.e. a diameter of about 0.4049 millimeters) and made of a suitable conductive material such as copper. Further, the electrically insulating layers 68, 70, and 72 comprise, in the preferred embodiment, a fluorocarbon polymer layer.

Spirally wound around the helix configuration 74 of insulated electrical leads 62, 64, and 66 are bare stainless steel strands 76. Preferably, there are twelve (12) outer strands 76 with each strand having an outer diameter of approximately 0.011 inches.

A conventional cable forming process is employed to tightly spiral wind the outer stainless steel strands 76 around the center conductors 62, 64, and 66 to form the relatively small diameter trolling wire 12 (i.e., less than 0.070 inches in diameter) while having the desired strength and durability. Preferably, the strands 76 are spirally wound in the opposite direction as that of the electrical leads 62, 64, and 66. The strands 76 adjoin against each other to form a protective sheath that envelopes the leads 62, 64, and 66. Desirably, the strands 76 are wound around the helix arrangement 74 approximately three (3) times for each four (4) centimeters of cable length. Further, the overall outer diameter of the resultant cable 12 is about 0.059 inches with a tensile strength of at least two hundred pounds (200 lbs).

Referring back to FIG. 1, camera assembly 16 preferably includes a housing 80 with a camera 82 and lower electronics unit 84 mounted therein. The housing 80 is generally parabolic in cross-sectional shape with a blunted front end 86 and an opposite open rear end 88. The desired shape of the housing 80 results in the housing rear end 88 being substantially directed at the lure 52 as the housing travels through the water 18 during trolling. The housing 80 may be constructed of any suitably material such as plastic, metal, or a metal alloy.

To further aid in the stability of the housing 80, release cord 46 is attached to the top 89 of the housing proximate to the rear end 88. As such, during trolling, the water resistance on the fishing line 50 and the release 48 acts as a rudder to aid in pointing the housing rear end 88 generally towards the lure 52. In addition, to dampen yaw and the like, fins (not shown) may be added to the outside of the housing 80.

As indicated above, the housing 80 provides an open cavity 90 in communication with the housing rear end 88. Enclosing the housing rear end 88 and forming a watertight seal with the housing 80 is an optically transparent cap 92. The seal is preferably waterproof to a depth of four hundred feet (400) or greater to prevent water from entering the housing cavity 90 and damaging the camera 82 mounted therein.

Camera 82 is mounted in the housing cavity 90 adjacent to the housing end cap 92. The lens of the camera 82 is pointed towards the fishing lure 52 such that the lure is in the field of view 54 and focus of the camera. Thus, camera 82 provides composite video signals representative of the images introduced within the camera's field of view 54.

The camera 82 desirably is a relative low light level type. For example, tests results with a ProVideo camera Model No. CVC-50BC with a resolution of 512(H)×492(V) picture elements, EIA standard 525 TV lines (60 fields per second), and a sensitivity of 0.1 lux (F:1.6). (CSI/SPECO, Lindenhurst, N.Y.). Preferably, the camera 82 has a focus range of approximately three (3) to ten (10) feet and is powered by twelve (12) volts at less than 1.2 watts.

Figure 4:
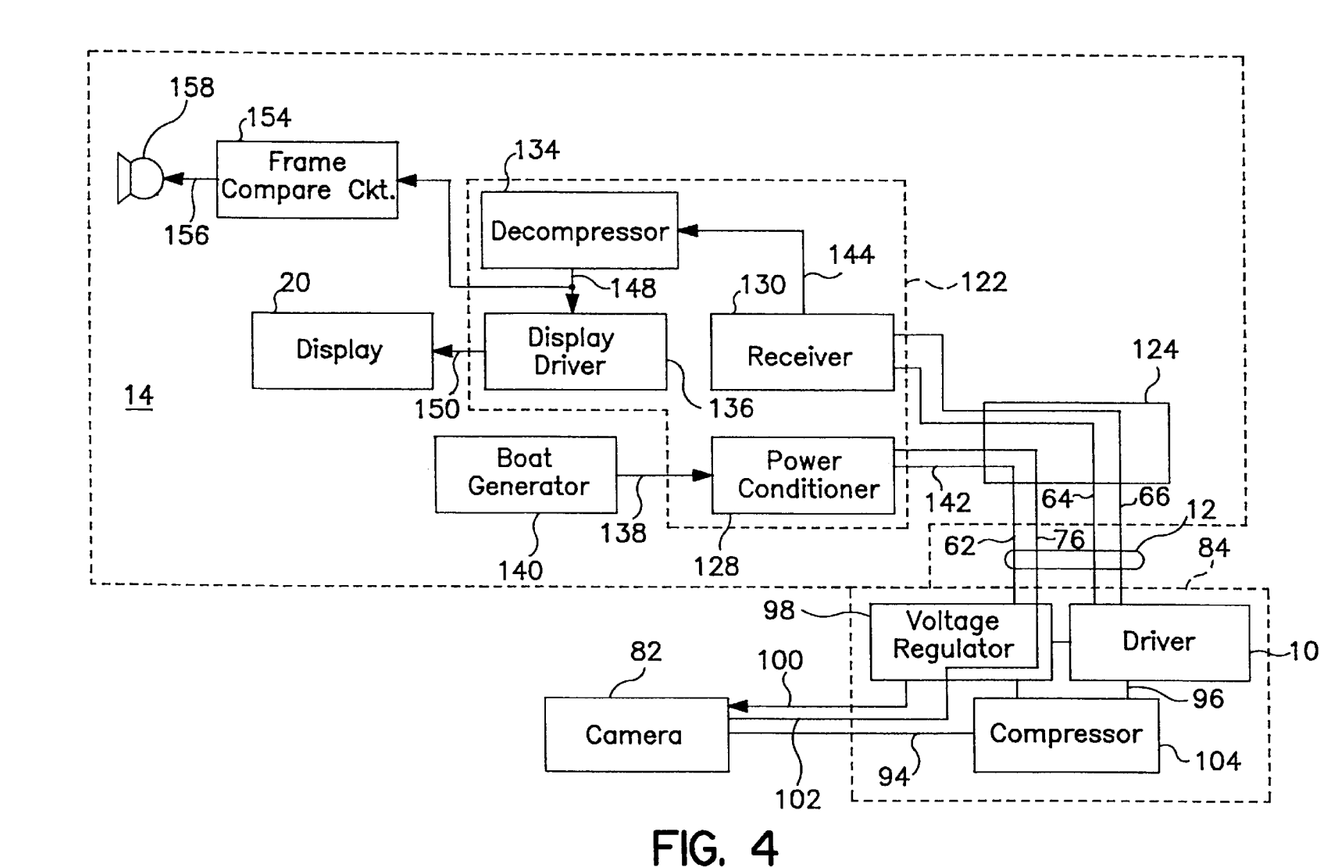
FIG. 4 is an electrical circuit diagram in block form of an embodiment of the underwater viewing system shown in FIG. 1.

The camera 82 is operably connected to the lower electronics unit 84 within the housing cavity 90. Further, as shown by FIG. 4, the lower electronics unit 84 is connected to conductive leads 62, 64, and 66 and at least one of the outer conductive strands 76 of cable 12. The outer strands 72 are secured to the housing 80 to pull the housing through the water during trolling with, as indicated above, at least one strand 76 extending into the housing cavity 90.

Within FIG. 4, a single block may indicate several individual components and/or circuits which collectively perform a single function. Likewise, except for the leads 62, 64, 66 and the conductive strands 76 of cable 12, a single line within FIG. 4 may represent several individual signal or energy transmission paths for performing a particular operation.

The lower electronics unit 84 provides for regulating the voltage supplied to the camera 82, compressing the composite video signals 94 generated by the camera, and driving the compressed video signals 96 from the camera assembly 16 to the boat 14.

A voltage potential is provided from the fishing boat 14, via power supply lead 62, to a voltage regulator 98 within the lower electronics unit 84. The voltage potential is regulated and conditioned by the voltage regulator 98 to supply the camera 82 with a suitable supply voltage 100. Likewise, the camera 82 is provided with a voltage return path 102 to the boat 14 via the serially connected electronics unit 84 and at least one strand 76 of cable 12.

In an embodiment wherein the cable 12 has a length of 200 feet or greater and color or black and white composite video signals are to be transmitted from the camera to the display, the lower electronics unit 84 provides a compressor 104 for compressing the composite video signals 94 in real-time. The compressor 104 is operably connected to the camera 82 for generating compressed video signals 96 from the camera output signals 94. At cable lengths of 200 feet or greater, such video compression is desirable to reduce bandwidth or reflections that occur as the cable 12 becomes a transmission line.

The process used by the compressor 104 to condense the composite video signals 94 can be by any appropriate means known in the art to compactly represent the image data contained within the composite video signals as output signals 96. For example, the compressor 104 may operate in a similar manner as that used by ANALOG DEVICES in their ADV 601 Low Cost Multiformat Video Codec. (Analog Devices, Inc., Norwood, Mass.). Correspondingly, the output signals 96 of the compressor 104 are directly related to the input signals 94 provided by camera 82.

The compressed video signals 96 generated by compressor 104 are received by driver 106 within the lower electronics unit 84. The driver 106 converts and transmits the compressed video signals 96 to the boat 14, via cable 12, as differential signals on twisted-pair leads 64 and 66. As such, the driver 106 may include a pair of video amplifiers with high-output drive capability or other like elements suitable for converting the compressed video signals 96 into differential output signals.

Figure 5:
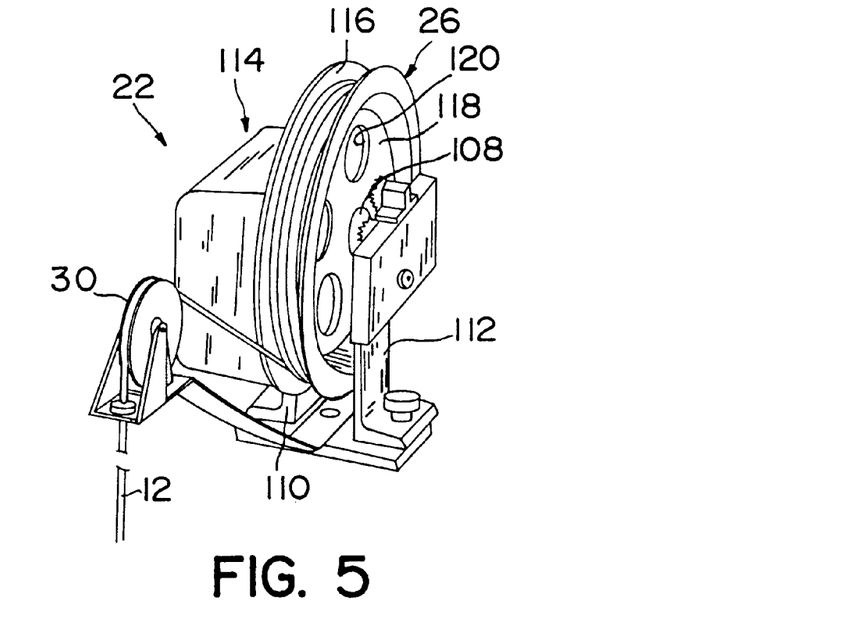
FIG. 5 is a front perspective view of the motorized reel assembly shown in FIG. 1.
Figure 6:
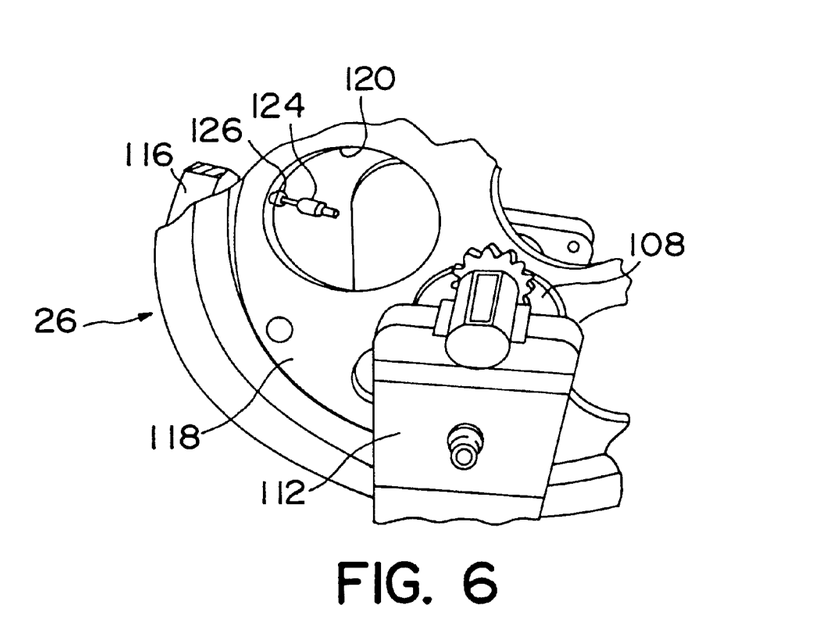
FIG. 6 is an enlarged partial perspective view of the motorized reel assembly shown in FIG. 5.

Turning to FIGS. 5 and 6, cable 12 is wrapped around the reel 26 of motorized assembly 22 which is conventional in construction. The motorized assembly 22 consists of, for example, the device disclosed by U.S. Pat. No. 3,916,555, issued to Booth et al., and incorporated herein by reference.

The reel 26 includes a central spindle 108 which is secured to a reel shaft rotatably supported between arms 110 and 112 by means of a pair of bearings fitted into the arms near the top. The shaft extends at one end into a reel drive unit 114 that includes a reversible drive motor to be rotatably driven thereby. The reel 26 is of ABS with a channeled perimeter 116 for holding the cable 12. A web 118 extends between spindle 108 and channel 116 of the reel 26 and includes a plurality of spaced apertures 120.

The cable 12 wound about reel 26 is operably connected to an upper electronics 122, depicted in FIG. 4, via a conventional quick disconnect connector 124. Preferably, the cable 12 extends through the end of reel channel 116 and is anchored at one end of the reel 26 at an edge of one of the apertures 120 by a crimping clip 126 or the like. An aperture is drilled through the channel and a portion of the reel web to allow cable 12 to be so anchored. The connector 124 is coupled to the end of the cable 12 to provide connecting means for electrically connecting the cable to the upper electronics unit 122.

Connecting the cable 12 to the upper electronics unit 122 in the manner described above ensures that the electrical characteristics of the signal transmission paths between the upper electronics unit and the lower electronics unit 84 are substantially constant. This is preferred over other methods of connecting the cable 12 to the upper electronics unit 122, such as using slip rings, which can generate noise and other unstable electrical characteristics in the cable signal transmission paths 62, 64, and 66.

The upper electronics unit 122 is mounted on the boat and, as shown in FIG. 4, is coupled via connector 124 to the electrical leads 62,64,66 and at least one of the outer conductive strands 76 of cable 12. The upper electronics unit 122 provides a power conditioner 128, a receiver 130, a decompressor 134, and a display driver 136.

The power conditioner 128 is coupled to an unregulated voltage source 138 provided by the boat 14 such as a marine battery or generator 140. The power conditioner 128, which is conventional in construction, regulates the boat voltage 138 to generate a conditioned supply voltage 142 that is transmitted, via lead 62, to the lower electronics unit 84.

Preferably, the power conditioner 128 converts the boat voltage 138 into a conditioned voltage 142 wherein noise generated by electromagnetic interference from other electrical systems on the boat is removed. The power conditioner 128 also is capable of providing a substantially constant voltage potential to the lower electronics unit 84 during periods where the boat supply voltage 138 is temporary interrupted or drops to a low level such as when starting the engine of the boat 14.

The typical fishing boat 14 will provide power conditioner 128 with an unregulated voltage potential 138 of about twelve (12) volts. However, because the camera 82 preferably requires a supply voltage 100 of twelve (12) volts, it is desired that the power conditioner 128 boost the supply voltage 142 to overcome the voltage drop across the cable 12. For example, if the camera 82 requires twelve (12) volts and the line drop across the cable 12 is two (2) volts, then the output of the upper electronics unit provides a conditioned supply voltage 142 of fourteen (14) volts.

In an alternative embodiment, the camera 82 may be powered by one or more batteries contained within the camera assembly 16. Thus, the upper electronics unit power conditioner 128, electrical lead 62, and lower electronics unit voltage regulator 98 would be eliminated in such an embodiment since the lower electronics unit 84 would contain its own self-sufficient voltage source.

Returning back to the preferred embodiment shown in FIG. 4, the upper electronics unit receiver 130 receives the differential signals transmitted, via twisted-pair leads 64 and 66, by driver 106. The receiver 130 converts the differential signals into an output signal 144 preferably consisting of a single ended compressed video output. As such, the receiver 130 may include a video amplifier with a high-output-drive capability or other like elements appropriate for converting differential signals into video output signals.

The video output 144 from receiver 130 is received by the decompressor 134 which transforms the compressed signals into reconstructed composite video signals 148 in real-time. Preferably, the compressed signals 144 are transmuted by using a suitable decompression algorithm such that the composite video signals 148 are substantially similar to the camera video output signals 94.

The display driver 136 is operably connected to the decompressor 134 for receiving the composite video signals 148. The display driver 136 processes the composite video signals 148 to generate display signals 150 compatible with display 20. Preferably, the display signals 150 are provided by display driver 136 in a standard NTSC video format.

As indicated above, the output signals 150 of driver 136 are received by display 20 which provides images of the lure 52 and any fish in the camera's field of view 54. The display 20 preferably consists of a conventional black and white CRT which can be powered by a twelve (12) volt source. Alternatively, the display 20 may provide color images of the lure 52 and any fish.

The present invention may also include a frame compare circuit 154 for generating an indicator signal 156 whenever a fish approaches the lure 52. The frame compare circuit 154 is operably connected to the upper electronics unit 122 for receiving reconstructed video signals 148 from decompressor 134. The compare circuit 154 detects changes in the video signals 148 such that, when a significant change as described below occurs, signal 156 is generated to activate a warning horn 158 or other audible alarm device.

Preferably, the frame compare circuit 154 filters the signal 148 such that motion of the lure 52 or gradual changes in water color will not cause activation of the horn 158. However, sudden significant changes, such as a fish approaching the lure 52, will result in the frame compare circuit 154 sounding the horn 158.

In operation, the fisherman lowers the weighted cable 12 and accompanying releasably attached fishing line 50 by actuating the motorized reel assembly 22 shown in FIGS. 1, 5, and 6. Once the desired depth has been reached, the reel assembly 22 is deactivated thus holding the fishing lure 52 substantially at the desired depth. With the present invention, a significant length of cable 12 can be wound on reel 26 to reach depths up to or even in excess of 200 feet where required.

The connector 124 is then coupled to the cable 12 to provide for the transmission of images about the lure 52 to the display 20. The fisherman then proceeds to troll with the camera assembly 16 while monitoring the real-time images of the lure 52 provided via display 20.

The strong stainless steel outer shield 78 of the cable 12 provides for the high tensile strength required for trolling with the submerged camera assembly 16, and weight 44, which may be payed out a significant distance and become snagged. Further, the twisted pair of data leads 64,66 within the cable 12 allow for the images from the camera to be transmitted, in real-time, to the boat 14.

If the fisherman becomes distracted, the frame compare circuit 154 will activated the horn 158 to alert the fisherman when a fish approaches the lure 52. The fish may strike the lure 52 which results in mechanism 48 releasing the fish line 50 so that the fisherman may play the fish without the fish line being attached to the downrigger.

Figure 7:
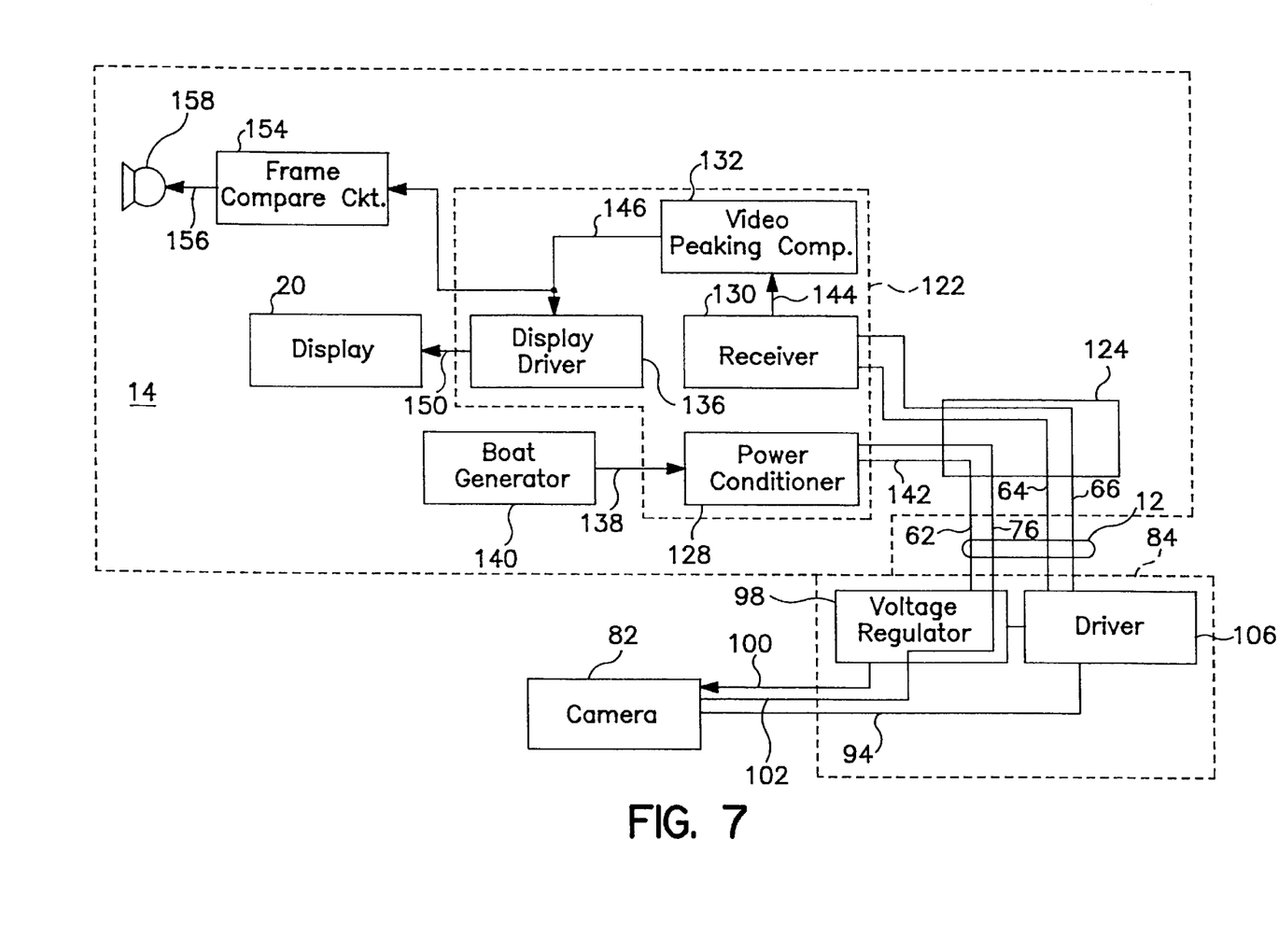
FIG. 7 is an electrical circuit diagram in block form of another embodiment of the underwater viewing system shown in FIG. 1.

Referring to FIG. 7, an electrical circuit diagram in block form is provided of another embodiment of the underwater viewing system shown in FIG. 1. The embodiment of FIG. 7 is similar to that of FIG. 4 except that the compressor has been eliminated and the decompressor has been replaced by a video peaking compensation circuit 132.

In FIG. 7, the cable 12 may have a length of 200 feet or greater and preferably is used for the transmission of black and white composite video signals from the camera to the display. As such, the driver 106 is operably connected to the camera 82 to receive the black and whit composite video signals 94. The driver 106 converts and transmits the video signals 94 to the boat 14, as differential signals, via twisted-pair leads 64 and 66.

The upper electronics unit 122 is attached to the cable 12 via connector 124 and preferably includes power conditioner 128, receiver 130, video peaking compensation circuit 132, and display driver 136. The receiver 130 within the upper electronics unit 122 receives the differential signals conveyed on twisted-pair leads 64 and 66. The receiver 130 converts the differential signals into output signal 144 which preferably consists of a single ended video output.

The video output 144 from receiver 130 is adjusted by the video peaking compensation circuit 132. The compensation circuit 132 increases bandwidth to correct for smearing and blurring of the video output caused by the RC time constant of the cable 12 capacitance. As such, the compensation circuit 132 produces rectified video output signals 146 that are substantially similar to the composite video signals 94 generated by the camera 82.

The display driver 136 is operably connected to the compensation circuit 132 for receiving the rectified video output signals 146. The display driver 136 processes the composite video signals 148 to generate display signals 150 compatible with display 20.

The frame compare circuit 154 may also be coupled to the rectified video output 146 of the compensation circuitry 132. Thus, the warning horn 158 will be activated if a fish approaches the lure 52.

It will be readily apparent from the foregoing detailed description of the invention and from the illustrations thereof that numerous variations and modifications may be effected without departing from the true spirit and scope of the novel concepts or principles of this invention.

What is claimed is:

1. An underwater viewing system for viewing underwater objects comprising:
    (a) a cable for transmitting video signals and comprising:
        (i) at least two conductive leads twisted about each other, said conductive leads being electrically isolated from each other; and
        (ii) an outer shield spirally surrounding said conductive leads, said outer shield comprising a plurality of strands of stainless steel, and said outer shield having a free end;
    (b) an underwater camera assembly attached to said free end of said cable whereby the camera assembly is capable, of imaging a fishing lure;
    (c) a weight attached by a safety cable to said underwater camera assembly; and
    (d) a fishing line release removably attached to said camera assembly.

2. The underwater viewing system of claim 1, wherein said outer shield comprises about twelve strands of stainless steel.

3. The underwater viewing system of claim 1, further comprising a camera within said underwater camera assembly for generating composite video signals of said underwater objects and a driver responsive to said composite video signals for transmitting differential signals related to said composite video signals onto said conductive leads.

4. The underwater viewing system of claim 3, further comprising a compressor within said underwater camera assembly and coupled between said camera and said driver for condensing said composite video signals into compressed video signals.

5. The underwater viewing system of claim 3, further comprising a voltage regulator coupled to at least one of said conductive leads for supplying said camera with a supply voltage.

6. The underwater viewing system of claim 3, further comprising a receiver coupled to said conductive leads and responsive to said differential signals for generating a receiver output signal, and a display driver responsive to said receiver output signal for generating a display signal related to said composite video signals.

7. The underwater viewing system of claim 6, further comprising a video peaking compensation circuit responsive to said receiver output signal for producing rectified video output signals of said underwater objects.

8. The underwater viewing system of claim 6, further comprising a decompressor coupled between said display driver and said receiver for extracting video signals of said underwater objects from said receiver output signals.

9. The underwater viewing system of claim 6, further comprising a frame compare circuit responsive to said receiver output signal for comparing frames of said underwater objects and generating an indicator signal and an audible alarm device responsive to said indicator signal for generating an audible warning.

* * * * *